UNITED STATES PATENT OFFICE.

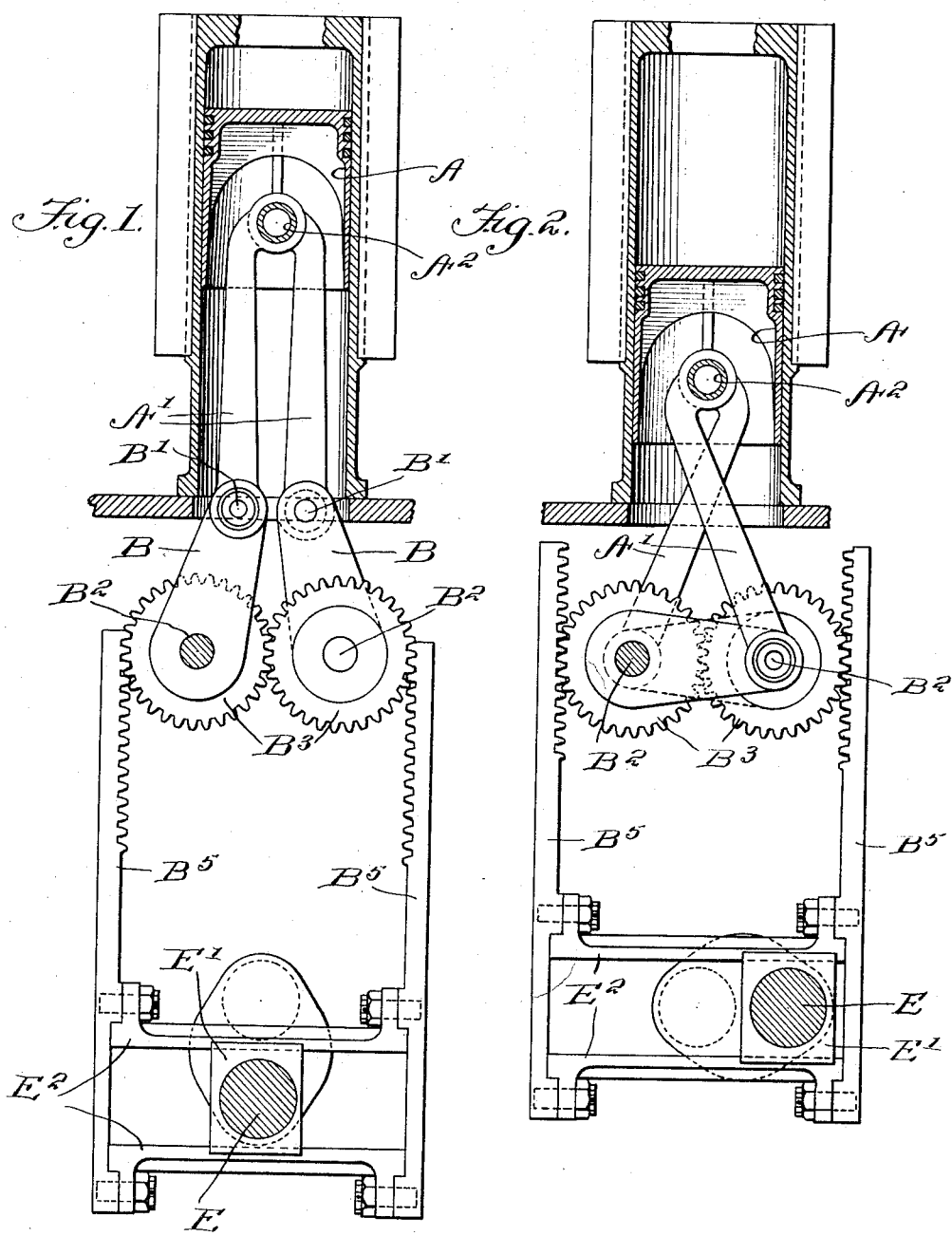

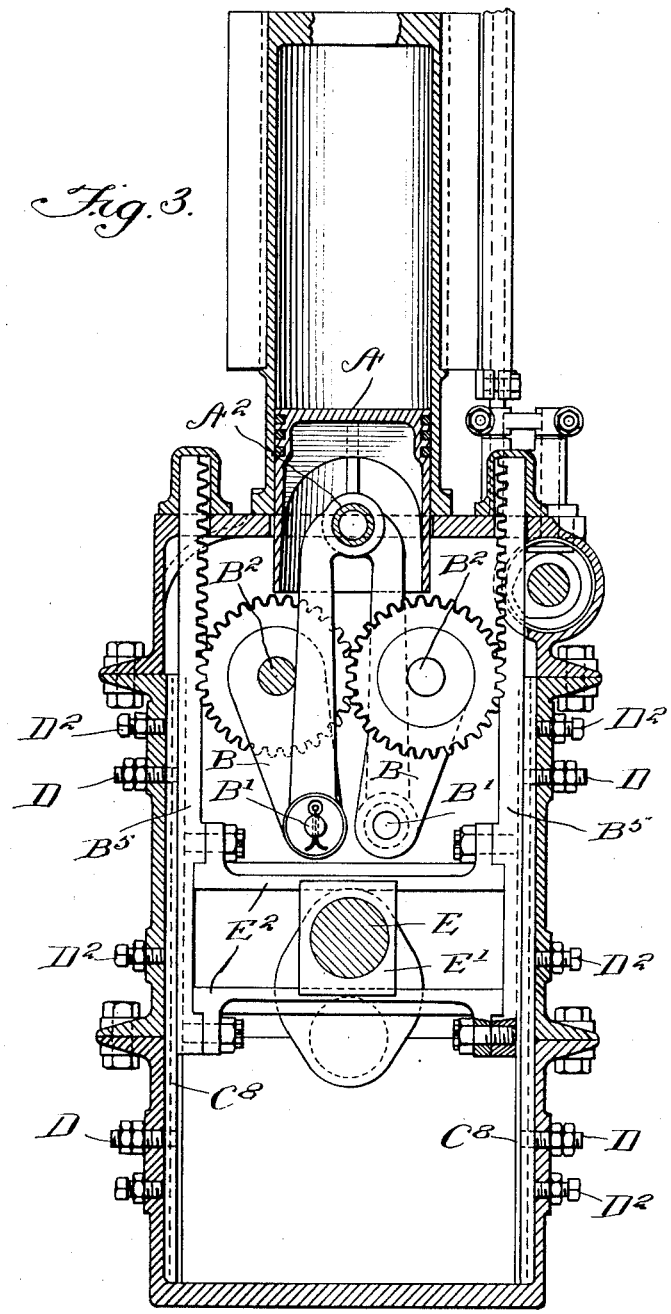

ALVAH L. POWELL, OF MILES CITY, MONTANA, ASSIGNOR TO THE A. L. POWELL POWER CO., OF MILES CITY, MONTANA, A CORPORATION.

TRANSMISSION FOR ENGINES.

1,384,339.      Specification of Letters Patent.      Patented July 12, 1921.

Application filed December 8, 1920. Serial No. 429,173.

*To all whom it may concern:*

Be it known that I, ALVAH L. POWELL, citizen of the United States, residing at Miles City, in the county of Custer and State of Montana, have invented certain new and useful Improvements in Transmission for Engines, of which the following is a specification.

My invention relates to improvements in the transmitting member of engines, by which I secure a variation in the movement of the piston with reference to that of the crank, enabling me to gain advantages in the operation of such engines that are not possible with the constructions at present used. This application covers improvements over the forms shown in applications bearing Serial Numbers 429,168, 429,170 to 429,172, inclusive, and 429,174 to 429,176, inclusive, filed simultaneously with it, and of the same date, but while the general principles are the same, the construction includes novel forms that have advantages peculiar to them. In the annexed drawings I show an application of my invention, in which Figures 1, 2 and 3 are elevations, showing the working parts at different points of stroke.

In my prior applications, I have described the lever cranks and racks as shown in the present one, but hitherto I have confined these racks to a movement either varying in angularity, or the connection between cranks and piston operated vertically. In my present improvement I cause the mechanism that transmits power to the shaft crank to not only move through a vertical plane but, at the same time, I partly balance the effect of the piston movement with reference to that of the crank, so that the motion of the said crank is always opposite to the direction of movement of the piston, by this means balancing the vibration caused by the action of piston and crank.

In the annexed drawings, Fig. 1, the piston A carries a pin, $A^2$, on which are suspended two links $A^1$, $A^1$. These links are attached to the lever cranks, B, B, by means of pins, $B^1$. The lever cranks are pivoted at $B^2$, $B^2$, on pins, as shown, the said pins being supported in the frame of the engine. On the pins $B^2$, $B^2$ are mounted gears, $B^3$, $B^3$, these meshing with each other, as shown. On the wrist pin E, Figs. 1 and 2, is a slide block, $E^1$, fitting to a crosshead, formed of the bars $E^2$, $E^2$. These bars are attached to vertical members, $B^5$, $B^5$, by means of tap bolts. The vertical members are toothed on the upper inner sides of said bars, as shown, in the various views. The teeth on the members mesh with the gears $B^3$, $B^3$. These vertical members are further supported by guides $C^8$, $C^8$, Fig. 3, fastened to the engine frame by bolts, D, D, controlled by adjustment screws $D^2$, $D^2$.

It is evident that on the downstroke of the piston A the links $A^1$, $A^1$ cause the lever cranks B and B to move, and that the gears cause the bars $B^5$, $B^5$, to move upward, the crank rotating from the pressure of the slide guides $E^2$, $E^2$. It is also evident that in order to start the engine the block E must always be in a position off the vertical center shown in Figs. 1 and 3.

The movement of the crank is therefore always opposed to that of the piston from which it derives its motion, the forces set up by this reaction tending to neutralize engine vibration, and insuring a crank action of great smoothness and efficiency. The difference between the radii of the pitch circles of the gears and the radii of the crank lever link pins also makes a difference in the stroke of engine crank with reference to piston stroke, the latter being long and the former short. I thus concentrate the power of a six inch, or relatively longer or shorter stroke of piston, into a crank throw of four inches, or one relatively longer or shorter.

Many modifications of my inventions are possible without departing from the general construction described in this application, and I do not limit myself to the exact arrangement shown.

What I believe is new and ask to have protected by Letters Patent, is—

In a transmission member, the combination of a piston, links hung from said piston, oppositely placed pins carrying pinions and levers arranged to rotate on said pins, said pinions meshing with each other; pins in said levers engaging the before mentioned links, vertically disposed racks meshing with the said pinions, bars holding the said racks, the said bars composing a crosshead guide, a crosshead block operating in crosshead, a wrist pin in said block, a crank, and means for connecting said wrist pin to said crank, for the purpose hereinbefore described.

In testimony whereof I affix my signature.

ALVAH L. POWELL.